US009208750B2

(12) United States Patent　　(10) Patent No.: US 9,208,750 B2
Tu　　(45) Date of Patent: Dec. 8, 2015

(54) COLOR TEMPERATURE ADJUSTING METHOD OF DISPLAY DEVICE

(71) Applicant: ASUSTeK COMPUTER INC., Taipei (TW)

(72) Inventor: Yi-Han Tu, Taipei (TW)

(73) Assignee: ASUSTek COMPUTER INC., Taipei (TW)

( * ) Notice: Subject to any disclaimer, the term of this patent is extended or adjusted under 35 U.S.C. 154(b) by 31 days.

(21) Appl. No.: 14/276,704

(22) Filed: May 13, 2014

(65) Prior Publication Data

US 2014/0333655 A1　Nov. 13, 2014

Related U.S. Application Data

(60) Provisional application No. 61/822,449, filed on May 13, 2013.

(30) Foreign Application Priority Data

Apr. 1, 2014　(TW) .................................. 103112169

(51) Int. Cl.
| | |
|---|---|
| *G09G 5/10* | (2006.01) |
| *G09G 5/02* | (2006.01) |
| *G06T 7/40* | (2006.01) |
| *H04N 9/73* | (2006.01) |
| *H04N 1/60* | (2006.01) |

(52) U.S. Cl.
CPC ............ *G09G 5/02* (2013.01); *G06T 7/408* (2013.01); *H04N 1/60* (2013.01); *H04N 1/6077* (2013.01); *H04N 9/73* (2013.01); *G09G 2320/0666* (2013.01)

(58) Field of Classification Search
None
See application file for complete search history.

(56) References Cited

U.S. PATENT DOCUMENTS

| 5,754,222 A * | 5/1998 | Daly et al. ................... 348/184 |
| 6,243,068 B1 * | 6/2001 | Evanicky et al. .............. 345/102 |
| 2007/0126887 A1 * | 6/2007 | Chino et al. ............... 348/223.1 |
| 2009/0195486 A1 * | 8/2009 | Moldvai et al. ............... 345/88 |
| 2010/0128052 A1 | 5/2010 | Keh |
| 2010/0289727 A1 * | 11/2010 | Miller et al. ................... 345/76 |
| 2014/0043354 A1 * | 2/2014 | Choi et al. ................... 345/590 |

FOREIGN PATENT DOCUMENTS

| CN | 101163253 | 4/2008 |
| TW | 200532637 | 10/2005 |

* cited by examiner

*Primary Examiner* — Phi Hoang
(74) *Attorney, Agent, or Firm* — Muncy, Geissler, Olds & Lowe, P.C.

(57) ABSTRACT

A color temperature adjusting method of a display device includes follow steps: generating a color temperature curve in CIE 1931 color space according to a color temperature range, a Planckian locus and a CIE daylight locus in the CIE 1931 color space; calculating a target color coordinate at the color temperature curve corresponding to target color temperature; generating a new brightness ratio of red, green and blue, respectively, according to the target color coordinate and tristimulus values of the brightest red, the brightest green and the brightest blue of the display device; generating a coefficient of red, green and blue, respectively, according to the new brightness ratios of red, green and blue and the tristimulus values of red, green and blue; and adjusting the color temperature of the display device according to the coefficients of red, green and blue.

10 Claims, 5 Drawing Sheets

COLOR TEMPERATURE ADJUSTING METHOD OF DISPLAY DEVICE

CROSS-REFERENCE TO RELATED APPLICATION

This application claims the priority benefit of TW application serial No. 103112169, filed on Apr. 1, 2014 and U.S. provisional application Ser. No. 61/822,449, filed on May 13, 2013. The entirety of the above-mentioned patent application is hereby incorporated by reference herein and made a part of specification.

BACKGROUND OF THE INVENTION

1. Field of the Invention

The invention relates to a color temperature adjusting method and, more particularly, to a color temperature adjusting method of a display device.

2. Description of the Related Art

Color configuration is important in design of a display device, and it can be presented via a color coordinate. Conventionally, in color temperature adjusting of the display device, a color coordinate of target color temperature is usually set on a Planckian locus or a commission internationale de l'eclairage (CIE) daylight locus in CIE 1931 color space. However, the color coordinate of high color temperature on the two curves would make the display color lean towards purple or pink. On the contrary, the color coordinate of low color temperature on the two curves would make the display color lean towards red.

A user is usually accustomed to that at high color temperature, the display color leans towards blue, and at low color temperature, the display color leans towards yellow. Consequently, it does not conform to the visual feel of a user to define the color coordinate of the target color temperature on a Planckian locus or a CIE daylight locus in CIE 1931 color space, which may reduce the watching quality.

BRIEF SUMMARY OF THE INVENTION

A color temperature adjusting method of a display device includes following steps: generating a color temperature curve in CIE 1931 color space according to a color temperature range, a Planckian locus of the CIE 1931 color space and a CIE daylight locus; calculating a target color coordinate on the color temperature curve corresponding to target color temperature; generating a new brightness ratio of red, green and blue, respectively, according to the target color coordinate and tristimulus values of brightest red, brightest green and brightest blue of the display device; generating a coefficient of red, green and blue, respectively, according to the new brightness ratios of red, green and blue and the tristimulus values of red, green and blue; and adjusting color temperature of the display device according to the coefficients of red, green and blue.

These and other features, aspects and advantages of the present invention will become better understood with regard to the following description, appended claims, and accompanying drawings.

DETAILED DESCRIPTION OF THE EMBODIMENTS

A color temperature adjusting method of a display device is illustrated with relating figures, and the same symbols denote the same components.

Figure 1:
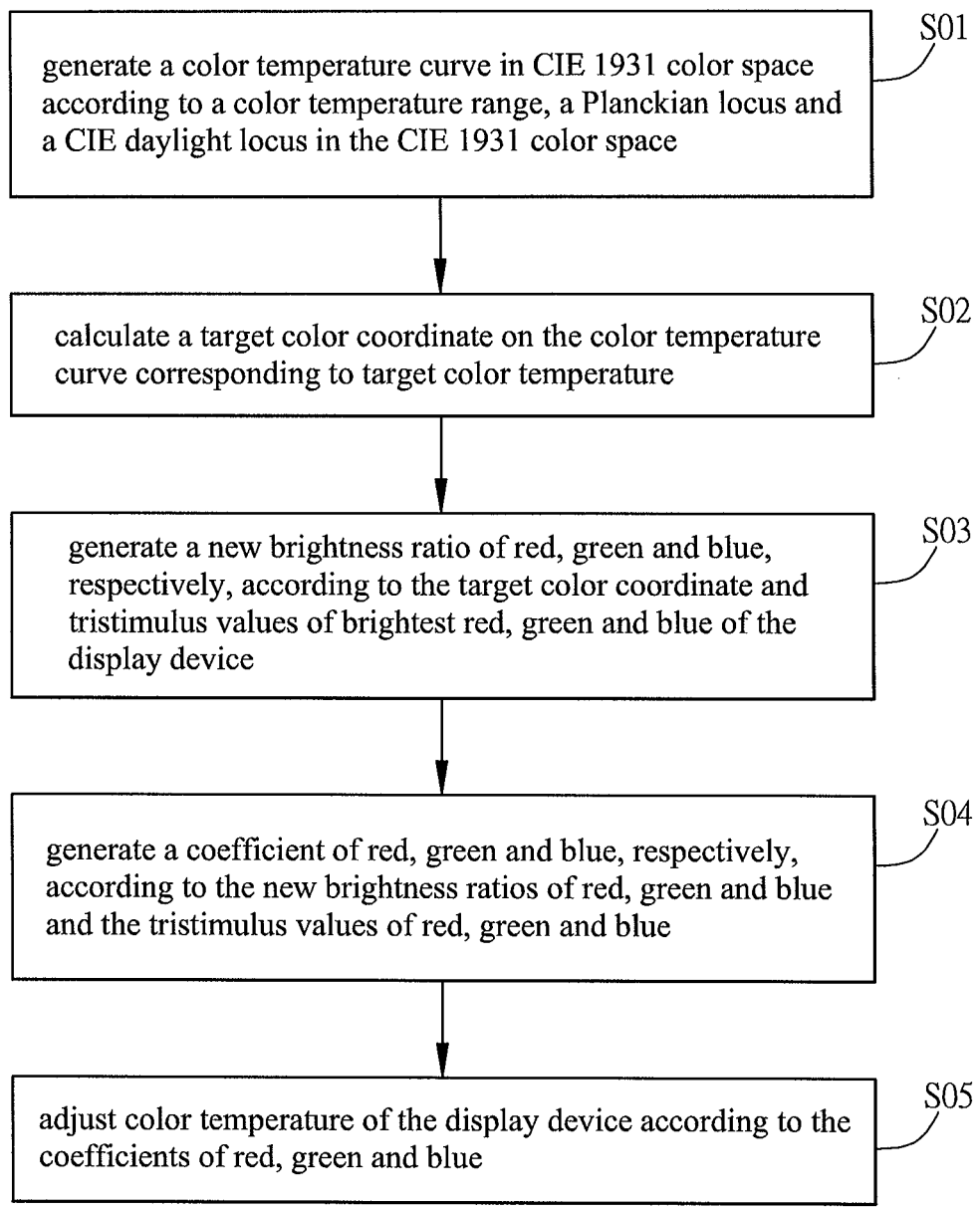
FIG. 1 is a flow chart showing a color temperature adjusting method of a display device in an embodiment.
Figure 2:
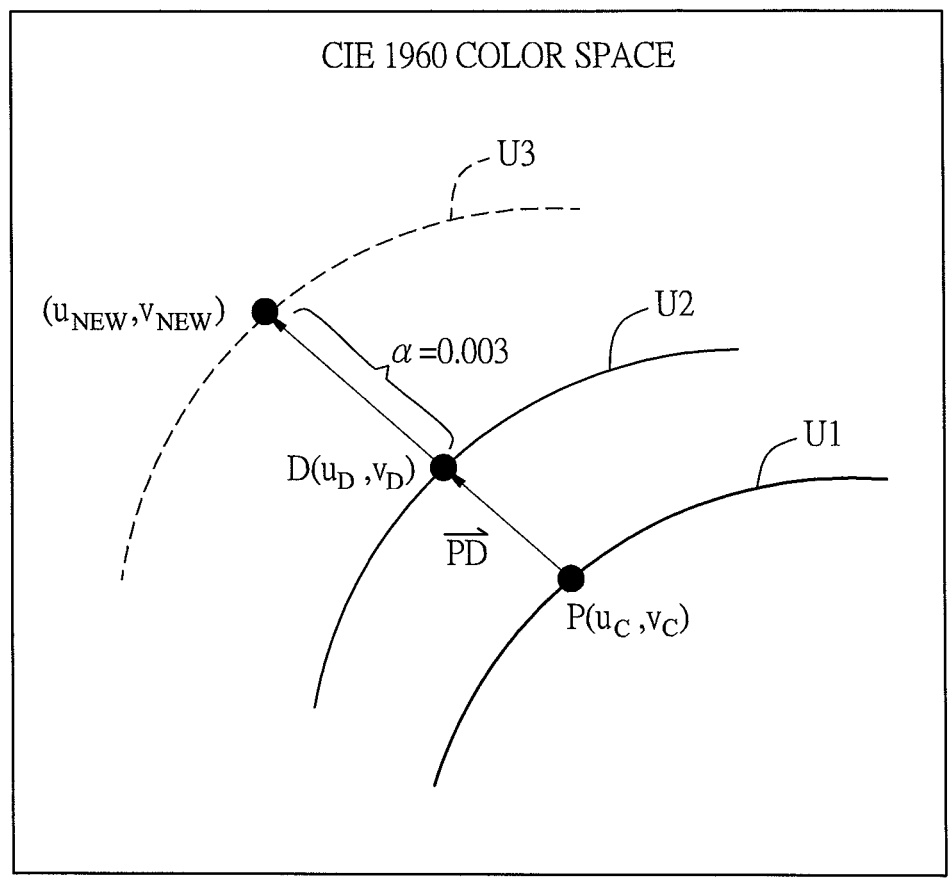
FIG. 2 is an enlarged view showing a Planckian locus, a daylight locus and a color temperature curve in an embodiment in CIE 1960 color space.

Please refer to FIG. 1 and FIG. 2, FIG. 1 is a flow chart showing a color temperature adjusting method of a display device in an embodiment, and FIG. 2 is an enlarged view showing a Planckian locus, a daylight locus and a color temperature curve in an embodiment in CIE 1960 color space. The display device may be a liquid crystal display (LCD) device or an organic light-emitting diode (OLED) display device. In the embodiment, an LCD device is taken as an example.

As shown in FIG. 1, the color temperature adjusting method includes steps S01 to S05.

First, in step S01, a color temperature curve is generated in CIE 1931 color space according to a color temperature range, a Planckian locus and a CIE daylight locus in the CIE 1931 color space. In the embodiment, the color temperature range is between 4000K and 25000K (which means "4000K≤the color temperature≤25000K", and the color temperature is in Kelvin as the unit). In other words, in order to conform to the visual feel of the user, a color coordinate of the target color temperature is not defined at the Planckian locus or the CIE daylight locus in the CIE 1931 color space. Instead, a new color temperature curve is defined according to the two curves, and the new color temperature curve more conforms to the visual feel of the user.

Figure 3:
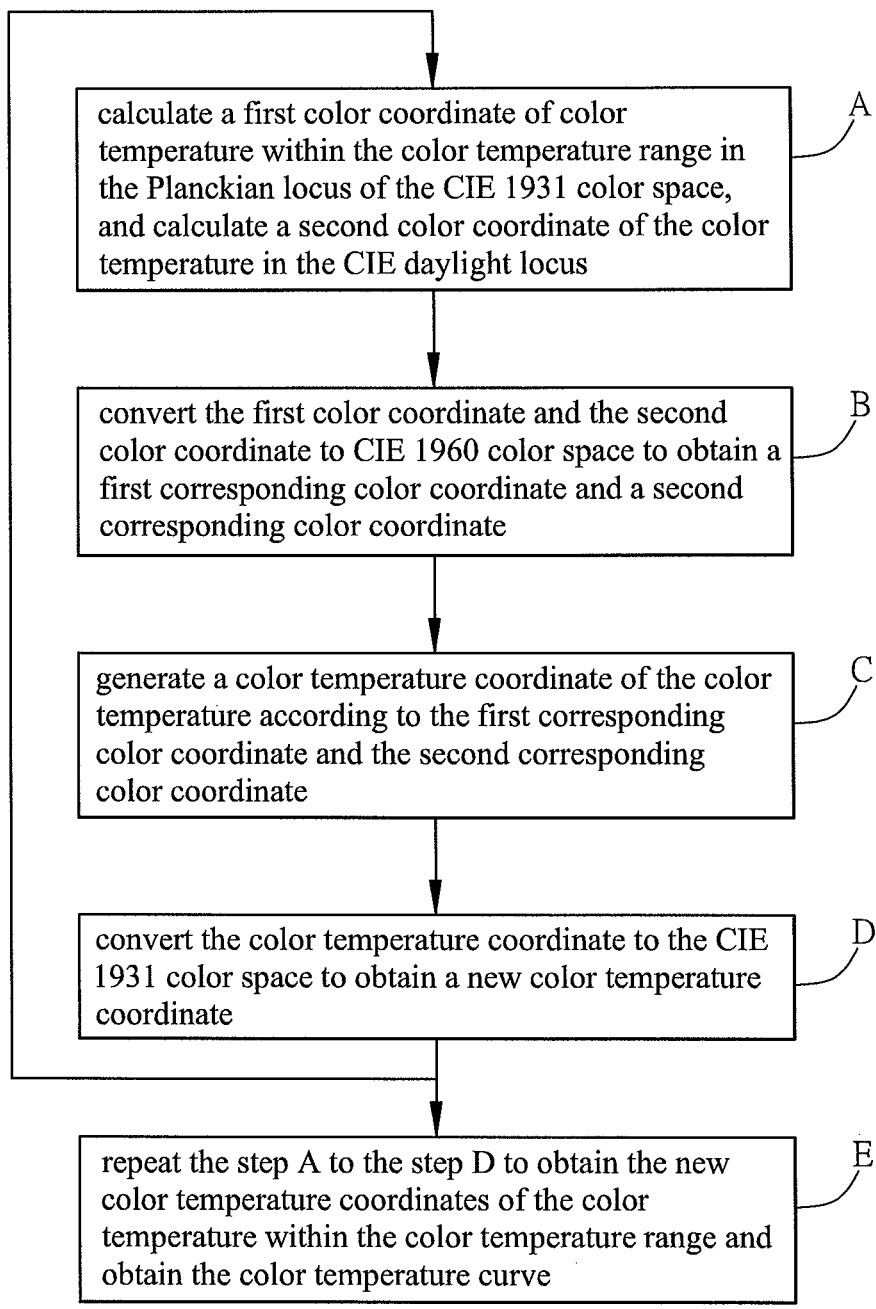
FIG. 3 is a flow chart showing steps of generating a new color temperature curve in an embodiment.
Figure 4:
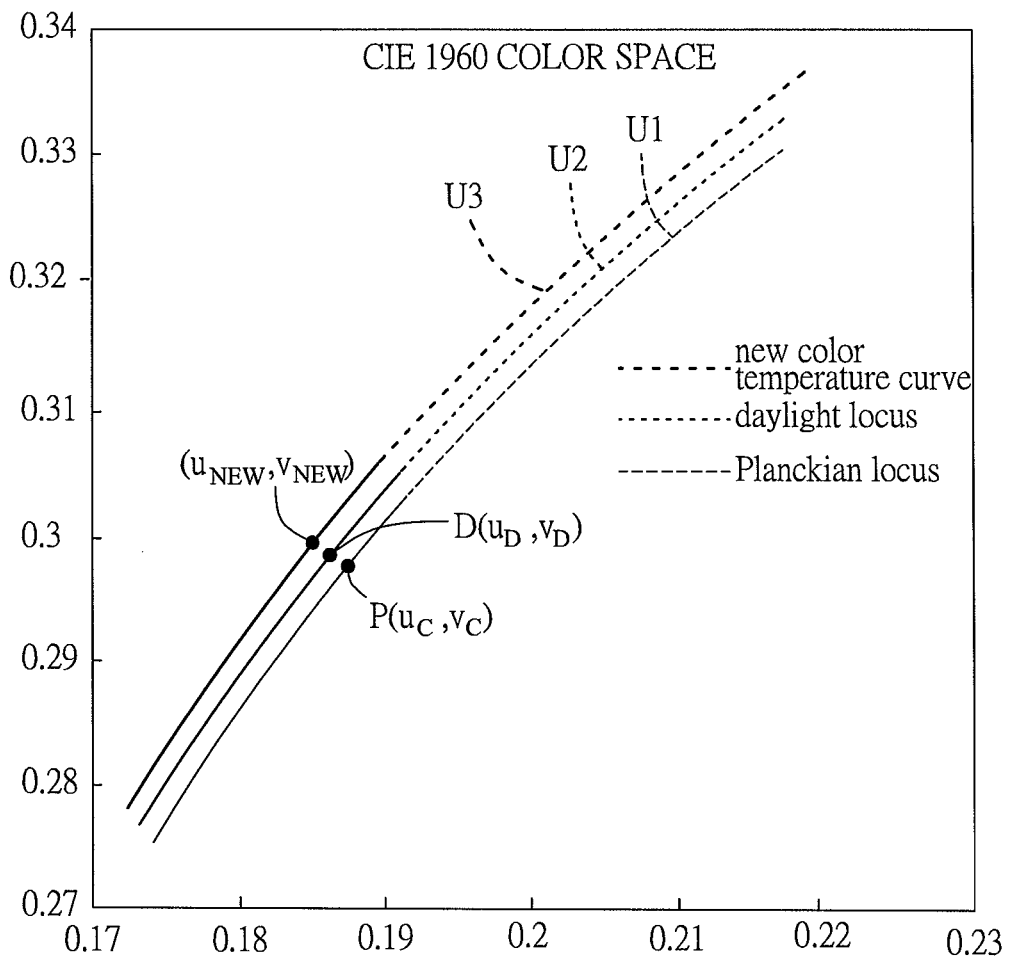
FIG. 4 is a comparing diagram showing a Planckian locus, a daylight locus and a color temperature curve in an embodiment in CIE 1960 color space.
Figure 5:
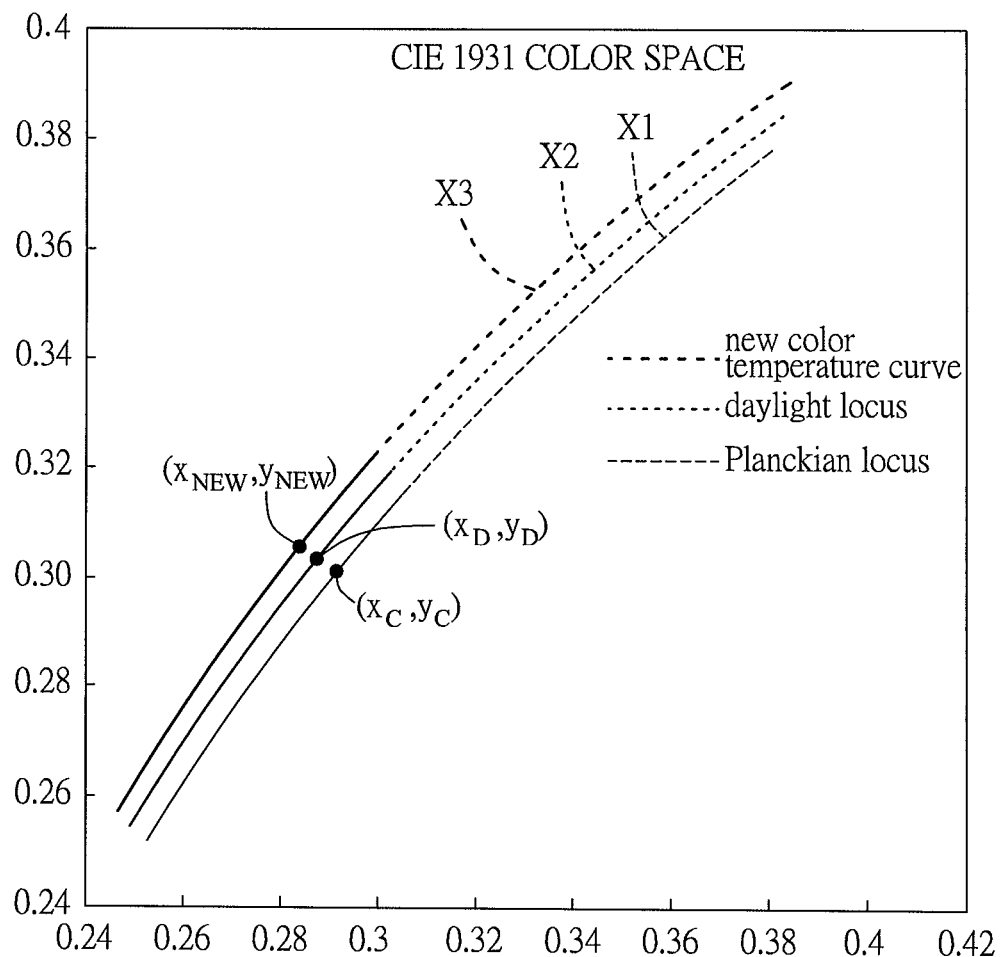
FIG. 5 is a comparing diagram showing a Planckian locus, a daylight locus and a color temperature curve in an embodiment in CIE 1931 color space.

Please refer to FIG. 2 to FIG. 5, the generation of the new color temperature curve is illustrated. FIG. 3 is a flow chart showing steps of generating the new color temperature curve in the embodiment, FIG. 4 is a comparing diagram showing the Planckian locus, the daylight locus and the color temperature curve in the embodiment in CIE 1960 color space, and FIG. 5 is a comparing diagram showing the Planckian locus, the daylight locus and the color temperature curve in the embodiment in the CIE 1931 color space. The steps of generating the new color temperature curve includes step A to step E.

As shown in FIG. 2, first, in step A: at the Planckian locus X1 in the CIE 1931 color space, a first color coordinate ($x_c$, $y_c$) of color temperature in the color temperature range is calculated, and a second color coordinate ($x_d$, $y_d$) of the color temperature at the CIE daylight locus x2 is calculated. In detail, as shown in FIG. 5, in order to obtain the new color temperature curve x3 in the CIE 1931 color space, an initial sampling point, such as 4000K (which can also be 25000K or other values), is obtained in the color temperature range (which is between 4000K and 25000K), and the color temperature T in 4000K is converted to the first color coordinate ($x_c$, $y_c$) at the Planckian locus space X1 in the CIE 1931 color and the second color coordinate $(x_d, y_d)$ at the CIE daylight locus X2. The conversion formula (1) of the first color coordinate $(x_c, y_c)$ is:

$$X_C = -3.0258469(10^9/T^3) + 2.1070379(10^6/T^2) + 0.2226347(10^3/T) + 0.240390$$

$$Y_C = 3.0817580 x_c^3 - 5.87338780 x_c^2 + 3.75112997 x_c - 0.37001483,$$

wherein, 4000K≤T≤25000K. The conversion formula (2) of the second color coordinate $(x_d, y_d)$ is:

$$x_D = \begin{cases} 0.244063 + 0.09911\frac{10^3}{T} + 2.9678\frac{10^6}{T^2} - 4.6070\frac{10^9}{T^3} & 4000 \text{ K} \le T \le 7000 \text{ K} \\ 0.237040 + 0.24748\frac{10^3}{T} + 1.9018\frac{10^6}{T^2} - 2.0064\frac{10^9}{T^3} & 7000 \text{ K} < T \le 25000 \text{ K} \end{cases}$$

$$y_D = -3.000 x_D^2 + 2.870 x_D - 0.275$$

After the first color coordinate $(x_c, y_c)$ and the second color coordinate $(x_d, y_d)$ are obtained, the step B is executed. As shown in FIG. 4, the first color coordinate $(x_c, y_c)$ and the second color coordinate $(x_d, y_d)$ are converted to the CIE 1960 color space to obtain a first corresponding color coordinate $P(u_c, v_c)$ and a second corresponding color coordinate $D(u_d, v_d)$. The conversion formula (3) is:

$$u = \frac{4x}{-2x + 12y + 3}, \quad v = \frac{6y}{-2x + 12y + 3}$$

Then, the step C is executed. A color temperature coordinate $(u_{new}, v_{new})$ of the color temperature is generated according to the first corresponding color coordinate $P(u_c, v_c)$ and the second corresponding color coordinate $D(u_d, v_d)$. In the embodiment, please refer to FIG. 2 and FIG. 4, in the step B, the first corresponding color coordinate $P(u_c, v_c)$ of the color temperature t at the Planckian locus U1 in the CIE 1960 color space and the second corresponding color coordinate $D(u_d, v_d)$ of the color temperature T at the CIE daylight locus U2 are calculated. Then, in the step C, the new color temperature coordinate $(u_{new}, v_{new})$ of the color temperature t in the CIE 1960 color space can be obtained by extending along the vector $\overrightarrow{PD}$ from the second corresponding color coordinate D. The calculation formula (4) of the color temperature coordinate $(u_{new}, v_{new})$ is:

$$(u_{New}, v_{New}) = D(u_D, v_D) + \alpha \frac{\overrightarrow{PD}}{|PD|}.$$

$$\overrightarrow{PD} = (u_D - u_C, v_D - v_C)$$

$$|PD| = \sqrt{(u_D - u_C)^2 + (v_D - v_C)^2}$$

$P(u_c, v_c)$ is the first corresponding color coordinate, $D(u_d, v_d)$ is the second corresponding color coordinate, $(u_{new}, v_{new})$ is the new color temperature coordinate, and α is between 0.001 and 0.005. The value of α is preferably 0.003, and it can be adjusted according to different requirements of visual feel.

Then, in the step D, the color temperature coordinate $(u_{new}, v_{new})$ is converted to the CIE 1931 color space to obtain a new color temperature coordinate $(x_{new}, y_{new})$. As shown in FIG. 5, the color temperature coordinate $(u_{new}, v_{new})$ in the CIE 1960 color space is converted to the CIE 1931 color space by using the formula (3) to obtain the new color temperature coordinate $(x_{new}, y_{new})$.

Finally, in the step E, the step A to the step D are repeated to obtain the new color temperature coordinates $(x_{new}, y_{new})$ of multiple color temperature in the color temperature range, so as to obtain the color temperature curve X3. Different color temperature values are obtained according to an interval sampling value, and then the corresponding new color temperature coordinates $(x_{new}, y_{new})$ are further obtained. In other words, 10K may be taken as the interval sampling value, and the step A to the step D are repeated at the color temperature of 4010K, 4020K, 4030K . . . 25000K, respectively. Thus, the multiple corresponding new color temperature coordinates $(x_{new}, y_{new})$ in the CIE 1931 color space are obtained, and they are connected to form a curve, which is the color temperature curve X3 in the step S01. Notably, the interval sampling value 10K is just an example. The interval sampling value may be different in other embodiments, and the smaller the interval sampling value is, the more precise the color temperature curve X3 is.

Consequently, after the new color temperature curve X3 (shown in FIG. 5) in the CIE 1931 color space is generated according to the Planckian locus X1 and the CIE daylight locus X2 in the CIE 1931 color space, please refer to FIG. 1, the step S02 is executed. A target color coordinate $(x_{tw}, y_{tw})$ (not shown) at the color temperature curve X3 corresponding to target color temperature is calculated. In the step A to the step D, the target color coordinate $(x_{tw}, y_{tw})$ of the target color temperature in the CIE 1931 color space is obtained via the new color temperature curve X3. The target color temperature is the color temperature of an image which is displayed by the display device, and the target color temperature is still between 4000K and 25000K.

Then, the step S03 is executed. A new brightness ratio of red, green and blue is generated, respectively, according to the target color coordinate $(x_{tw}, y_{tw})$ and tristimulus values of brightest red (R), brightest green (G) and brightest blue (B) of the display device in the CIE 1931 color space. The tristimulus values X, Y, Z of the original brightest red, the brightest green and the brightest blue of the display device in the CIE 1931 color space are converted to the color coordinates (x, y) in the CIE 1931 color space, respectively, via the formula (5), and then the new brightness ratios of red, green and blue are calculated via the color coordinates (x, y) and the target color coordinate $(x_{tw}, y_{tw})$ of the target color temperature in the formula (6). For example, the original brightest red of the display device means "R=255, G=0, B=0", the original brightest green means "R=0, G=255, B=0", and the original brightest blue means "R=0, G=0, B=255".

The tristimulus values of the brightest red, green and blue of the display device are $(X_R, Y_R, Z_R)$, $(X_G, Y_G, Z_G)$, $(X_B, Y_B, Z_B)$, respectively. The formula (5) is: x=X/(X+Y+Z), y=Y/(X+Y+Z), and the formula (6) of the new brightness ratio of the target color temperature ("R" and "r" represent red, "G" and "g" represent green and "B" and "b" represent blue) is:

$$Ratio_R:Ratio_G:Ratio_B =$$

$$\begin{vmatrix} \frac{x_{tw}-x_g}{y_g} & \frac{x_{tw}-x_b}{y_b} \\ \frac{y_{tw}-y_g}{y_g} & \frac{y_{tw}-y_b}{y_b} \end{vmatrix} : \begin{vmatrix} \frac{x_{tw}-x_b}{y_b} & \frac{x_{tw}-x_r}{y_r} \\ \frac{y_{tw}-y_b}{y_b} & \frac{y_{tw}-y_r}{y_r} \end{vmatrix} : \begin{vmatrix} \frac{x_{tw}-x_r}{y_r} & \frac{x_{tw}-x_g}{y_g} \\ \frac{y_{tw}-y_r}{y_r} & \frac{y_{tw}-y_g}{y_g} \end{vmatrix}$$

After the new brightness ratio is obtained, the step S04 is executed. A coefficient ($Coef_R, Coef_G, Coef_B$) of red, green and blue is generated, respectively, according to the new brightness ratios of red, green and blue and the tristimulus values X, Y, Z of red, green and blue in the CIE 1931 color space. The coefficients ($Coef_R, Coef_G, Coef_B$) are obtained via the following formulas, wherein "$Coef_R$" is the coefficient of red, "$Coef_G$" is the coefficient of green, "$Coef_B$" is the coefficient of blue, and "m" is a screen characteristic parameter of the display device.

$$Coef_i = \left(\frac{Y_i'}{Y_i}\right)^{\frac{1}{m}},$$

$$i \in \{R, G, B\}, Y_i' = A_{min} \times i_{ratio},$$

$$A_{min} = \text{Min}\left(\frac{Y_R}{Ratio_R}, \frac{Y_G}{Ratio_G}, \frac{Y_B}{Ratio_B}\right)$$

Finally, the step S05 is executed. The color temperature of the display device is adjusted according to the coefficients ($Coef_R, Coef_G, Coef_B$) of red, green and blue. First, an adjusting matrix is generated according to the coefficients ($Coef_R, Coef_G, Coef_B$) of red, green and blue, and then the color temperature of the display device is changed according to the adjusting matrix. The adjusting matrix is a "3×3" matrix:

$$\begin{bmatrix} Coef_R & 0 & 0 \\ 0 & Coef_G & 0 \\ 0 & 0 & Coef_B \end{bmatrix}$$

In other embodiments, a look-up table of red, green and blue may also be generated, respectively, according to the coefficients ($Coef_R, Coef_G, Coef_B$) of red, green and blue, and the color temperature of the display device is changed according to the look-up tables. The look-up tables may be generated according to the formula below:

$$LUT_i(n) = n \times Coef_i, \forall n=0,1,\ldots,255, i \in \{R, G, B\}.$$

Three groups of the look-up tables of red, green and blue are generated via the coefficients ($Coef_R, Coef_G, Coef_B$), and they are written to a gamma table defined in a graphics card of the display device (the look-up table needs to be adjusted to a value range of the gamma table). After the adjusting matrix or the look-up table of red, green and blue is obtained, the color temperature of the display device can be adjusted accordingly. Persons having ordinary skill in the art can adjust the color temperature of the display device accordingly, the details of adjusting are omitted herein.

In sum, in the color temperature adjusting method of the display device, the new color temperature curve in the CIE 1931 color space is generated according the color temperature range, the Planckian locus and the CIE daylight locus in CIE 1931 color space, the target color coordinate at the color temperature curve corresponding to the target color temperature is calculated, and the new brightness ratios and the coefficients of red, green and blue are generated accordingly to adjust the color temperature of the display device. Consequently, the color of the display device can conform to the visual feel of the user better.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A color temperature adjusting method of a display device comprising following steps:
   generating a color temperature curve in commission internationale de l'eclairage (CIE) 1931 color space according to a color temperature range, a Planckian locus and a CIE daylight locus in the CIE 1931 color space;
   calculating a target color coordinate on the color temperature curve corresponding to target color temperature;
   generating a new brightness ratio of red, green and blue, respectively, according to the target color coordinate and tristimulus values of brightest red, brightest green and brightest blue of the display device;
   generating a coefficient of red, green and blue, respectively, according to the new brightness ratios of red, green and blue and the tristimulus values of red, green and blue; and
   adjusting color temperature of the display device according to the coefficients of red, green and blue.

2. The color temperature adjusting method according to claim 1, wherein the color temperature range or the target color temperature is between 4000K and 25000K.

3. The color temperature adjusting method according to claim 2, wherein the step of generating the color temperature curve further includes:
   A. calculating a first color coordinate in the Planckian locus of the CIE 1931 color space corresponding to a color temperature of the color temperature range, and calculating a second color coordinate in the CIE daylight locus corresponding to the color temperature;
   B. converting the first color coordinate and the second color coordinate to CIE 1960 color space to obtain a first corresponding color coordinate and a second corresponding color coordinate;
   C. generating a color temperature coordinate of the color temperature according to the first corresponding color coordinate and the second corresponding color coordinate; and
   D. converting the color temperature coordinate to the CIE 1931 color space to obtain a new color temperature coordinate.

4. The color temperature adjusting method according to claim 3, wherein the step of generating the color temperature curve further includes:
   E. repeating the step A to the step D to obtain the new color temperature coordinates of the color temperature within the color temperature range and obtaining the color temperature curve.

5. The color temperature adjusting method according to claim 4, wherein in the step of obtaining the new color temperature coordinates of the color temperature within the color temperature range, values of the color temperature are obtained according to an interval sampling value.

6. The color temperature adjusting method according to claim 3, wherein in the step C, the color temperature coordinate conforms to a formula:

$$(u_{New}, v_{New}) = D(u_D, v_D) + \alpha \frac{\vec{PD}}{|PD|},$$

$$\vec{PD} = (u_D - u_C, v_D - v_C)$$

$$|PD| = \sqrt{(u_D - u_C)^2 + (v_D - v_C)^2}$$

wherein $P(u_C, v_C)$ is the first corresponding color coordinate, $D(u_D, v_D)$ is the second corresponding color coordinate, $(u_{New}, v_{New})$ is the color temperature coordinate, and $\alpha$ is between 0.001 and 0.005.

7. The color temperature adjusting method according to claim 1, wherein the step of generating the new brightness ratio of red, green and blue, respectively, further includes:
converting the tristimulus values of red, green and blue to color coordinates in the CIE 1931 color space.

8. The color temperature adjusting method according to claim 1, wherein the step of adjusting the color temperature of the display device further includes:
generating an adjusting matrix according to the coefficients of red, green and blue; and
changing the color temperature of the display device according to the adjusting matrix.

9. The color temperature adjusting method according to claim 8, wherein the adjusting matrix is:

$$\begin{bmatrix} Coef_R & 0 & 0 \\ 0 & Coef_G & 0 \\ 0 & 0 & Coef_B \end{bmatrix},$$

and wherein CoefR is the coefficient of red, CoefG is the coefficient of green, and CoefB is the coefficient of blue.

10. The color temperature adjusting method according to claim 1, wherein the step of adjusting the color temperature of the display device includes:
generating a look-up table of red, green and blue, respectively, according to the coefficients of red, green and blue; and
changing the color temperature of the display device according to the look-up tables.

* * * * *